(12) United States Patent
Cavell et al.

(10) Patent No.: US 6,686,491 B2
(45) Date of Patent: Feb. 3, 2004

(54) ALUMINUM COMPLEXES FOR OLEFIN POLYMERIZATION

(75) Inventors: Ronald G. Cavell, Edmonton (CA); Qinyan Wang, Calgary (CA); Aparna Kasani, Edmonton (CA)

(73) Assignee: The Governors of the University of Alberta (CA)

( * ) Notice: Subject to any disclaimer, the term of this patent is extended or adjusted under 35 U.S.C. 154(b) by 3 days.

(21) Appl. No.: 10/199,411

(22) Filed: Jul. 19, 2002

(65) Prior Publication Data

US 2003/0028041 A1 Feb. 6, 2003

Related U.S. Application Data

(63) Continuation of application No. 09/634,194, filed on Aug. 9, 2000, now Pat. No. 6,444,834.

(51) Int. Cl.[7] .............................. C07F 5/06; B01J 31/00; C08F 4/06
(52) U.S. Cl. ...................... 556/174; 556/176; 556/178; 526/126; 526/131; 526/134; 526/154; 502/103
(58) Field of Search ................................. 556/174, 176, 556/178, 126, 131, 134, 154; 502/103

(56) References Cited

U.S. PATENT DOCUMENTS

| | | | |
|---|---|---|---|
| 5,534,474 A | 7/1996 | Becker et al. | 502/152 |
| 5,589,555 A | 12/1996 | Zboril et al. | 526/64 |
| 6,235,919 B1 | 5/2001 | Cavell et al. | 556/174 |
| 6,239,061 B1 * | 5/2001 | Wang et al. | 502/162 |

FOREIGN PATENT DOCUMENTS

EP  0 668 295 A1  8/1995

OTHER PUBLICATIONS

Martyn P. Coles and Richard F. Jordan, Cationic Aluminum Alkyl Complexes Incorporating Amidinate Ligands, Transition–Metal–Free Ethylene Polymerization Catalysts, J. Am. Chem. Soc., 1997, 8125–8126.

Michael Bruce, Vernon C. Gibson, Carl Redshaw, Gregory A. Solan, Andrew J.P. White and David J. Williams, Ethylene Polymerization Catalysts based on monoanionic N,N, N–pyridyliminoamide ligands, Chem. Commun., 1998, 2523–2524.

Kasani Aparna and Ronald G. Cavell, Chemistry of Novel Alkyl Aluminum Bis(iminophosphorano) –methanide and –methanediide Complexes, presentation given on May 27, 2000.

Christopher M. Ong and Douglas W. Stephan, Poster Presentation, The Development of Diimine and Phosphinimine Ligand Systems, University of Windsor, May 31, 1999, Canadian Chemistry Conference.

* cited by examiner

Primary Examiner—Porfirio Nazario-Gonzalez
(74) Attorney, Agent, or Firm—Kenneth H. Johnson

(57) ABSTRACT

It is known to polymerize olefins using transition metal complexes and/or compounds. There is an ongoing search for catalysts for olefin polymerization which do not rely on transition metals as the active center. The present invention provides novel aluminum phosphinimine complexes, containing additional heteroatoms which are useful in the polymerization of olefins.

39 Claims, No Drawings

ALUMINUM COMPLEXES FOR OLEFIN POLYMERIZATION

This is a continuation of application Ser. No. 09/634,194, filed Aug. 9, 2000, now U.S. Pat. No. 6,444,834.

FIELD OF THE INVENTION

The present invention relates to novel phosphinimine aluminum complexes containing additional heteroatoms selected from the group consisting of oxygen, nitrogen and sulfur.

BACKGROUND OF THE INVENTION

Over the last fifteen years or so there has been an increasing interest in complexes other than the Ziegler-Natta complexes which have the potential to polymerize olefins. The work of EXXON and Dow have lead to the commercialization of metallocene and constrained geometry catalysts which produce polymers tending to have a single active catalyst site. This type of research has lead to more complex ligand structures such as those of Brookhart which also show activity as polymerization catalysts. These systems are used with transition metals as the active catalyst center. There is a desire to find new species which may be capable of olefin polymerization with metals other than the transition metals.

There was a poster presentation by Christopher M. Ong and Professor Douglas W. Stephan of the University of Windsor at the summer meeting of the Chemical Institute of Canada in Toronto which disclosed aluminum phosphinimine complexes. The complex disclosed is a mono aluminum complex having phenyl substituents on the phosphorus atom and trimethyl silyl substituents on the nitrogen atom. The presentation does not disclose the dimer (i.e. carbene complex) of the present invention.

Jordan et al. JACS 1997,119, 8125 "Cationic Aluminum Alkyl Complexes Incorporating Amidinate Ligands", teaches amine, imine and aluminum complexes. The paper does not teach complexes of aluminum phosphinimine. The polymerization activity of the complexes of Jordan is very low.

Gibson et al. Chem. Commun. 1998, 2523 "Novel Aluminum Ethylene Polymerization Catalysts Based on Monoanionic N,N,N,-Pyridyliminoamide Ligands" teaches the polymerization of ethylene using a complex with a "Brookhart" tridentate ligand and aluminum. Gibson's catalyst does not teach the complexes of aluminum phosphinimine of the present invention. Further, the polymerization activity of the complexes of Gibson is very low.

Applicants' co-pending U.S. patent application Ser. No. 09/375,618 filed Aug. 17, 1999 discloses precursors for the complexes of the present invention but does not disclose the complexes of the present invention.

There was a presentation at the Canadian Chemical Society National Conference, Calgary, May 27–31, 2000 entitled "Chemistry of Novel Alkyl Aluminum Bis (iminophosphorano)-Methanide and Methanediide Complexes" by Kasani Aparna and Ronald G. Cavell, Department of Chemistry, University of Alberta. The paper does disclose synthesis of some of the compounds of the present invention. The presentation does not disclose that the compounds of the present invention would be useful in the polymerization of olefins polymers.

The present invention seeks to provide novel aluminum complexes and processes for polymerizing olefins using such complexes.

SUMMARY OF THE INVENTION

The present invention provides a complex of formula I:

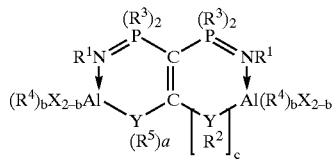

wherein each $R^1$ is independently selected from the group consisting of a $C_{1-8}$ straight or branched alkyl radical, a $C_{6-12}$ cyclic aliphatic or aromatic radical and a radical of the formula $Si(R^6)_3$ wherein each $R^6$ is independently selected from the group consisting of $C_{1-8}$ alkyl and alkoxy radicals; $R^2$ is selected from the group consisting of $C_{1-8}$ straight chained, branched or cyclic aliphatic radicals and $C_{6-12}$ cyclic aliphatic and aromatic radicals; c is 0 or 1; each $R^3$ is independently selected from the group consisting of $C_{1-8}$ alkyl radicals and $C_{6-12}$ aromatic radicals which are unsubstituted or substituted by one or more substituents selected from the group consisting of halogen atoms and $C_{1-4}$ alkyl radicals; each $R^4$ is independently selected from the group consisting of $C_{1-8}$ alkyl radicals, X is a halogen atom and b is 1 or 2; $R^5$ is selected from the group consisting of $C_{1-8}$ straight chained, branched or cyclic aliphatic radicals and $C_{6-12}$ cyclic aliphatic and aromatic radicals; Y is a heteroatom selected from the group consisting of an oxygen atom, a nitrogen atom and a sulfur atom and a is an integer so that the valence state of Y−2=a.

The present invention further provides a process for preparing a complex of formula I, comprising reacting a compound of formula II:

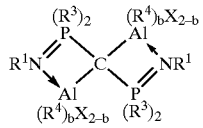

wherein each $R^1$ is independently selected from the group consisting of a $C_{1-8}$ straight or branched alkyl radical, a $C_{6-12}$ cyclic aliphatic or aromatic radical and a radical of the formula $Si(R^6)_3$ wherein each $R^6$ is independently selected from the group consisting of $C_{1-8}$ alkyl and alkoxy radicals; each $R^3$ is independently selected from the group consisting of $C_{1-8}$ alkyl radicals and $C_{6-12}$ aromatic radicals which are unsubstituted or substituted by one or more substituents selected from the group consisting of halogen atoms and $C_{1-4}$ alkyl radicals; each $R^4$ is independently selected from the group consisting of $C_{1-8}$ alkyl radicals, X is a halogen atom and b is 1 or 2; with a compound selected from the group consisting of $R^5YC(YR^2)_d$ and $R^2Y=C=O$ wherein $R^2$ is selected from the group consisting of $C_{1-8}$ straight chained, branched or cyclic aliphatic radicals and $C_{6-12}$ cyclic aliphatic and aromatic radicals; d is 0 or 1; $R^5$ is selected from the group consisting of $C_{1-8}$ straight chained, branched or cyclic aliphatic radicals and $C_{6-12}$ cyclic aliphatic and aromatic radicals; Y is a heteroatom selected from the group consisting of an oxygen atom, a nitrogen atom and a sulfur atom, provided that if a reactant of the formula $R^2Y=C=O$ is used in the complex of formula I, a is 0 and if a reactant of the formula $R^5YC(YR^2)_d$ is used if d is 1 c is 1 and if d is 0, c is 0.

The present invention further provides a process for polymerizing one or more $C_{2-8}$ olefins at a temperature from 20° C. to 120° C. and at a pressure from 15 to 4500 psig in the presence of a complex according to claim 1 and an activator selected from the group consisting of:

(i) aluminoxane compounds $R^{20}{}_2AlO(R^{20}AlO)_m AlR^{20}{}_2$ wherein each $R^{20}$ is independently selected from the group consisting of $C_{1-20}$ hydrocarbyl radical and m is from 5 to 30 to provide a molar ratio of aluminum in the activator to aluminum in the complex from 20:1 to 1000:1;

(ii) anions of the formula $[B(R^{18})_4]^-$ wherein each $R^{18}$ is independently selected from the group consisting of phenyl radicals which are unsubstituted or substituted by up to 5 substituents selected from the group consisting of a fluorine atom, a $C_{1-4}$ alkyl or alkoxy radical which is unsubstituted or substituted by a fluorine atom and a silyl radical of the formula —$Si(R^{19})_3$; wherein each $R^{19}$ is independently selected from the group consisting of a hydrogen atom and a $C_{1-4}$ alkyl radical; and an activator of the formula $[B(R^{18})_3]$ wherein $R^{18}$ is as defined above, to provide a molar ratio of B:Al from 0.4 to 1.2; and (iii) a mixture of (i) and (ii) above.

In a further embodiment the present invention also provides a process for polymerizing one or more $C_{2-8}$ olefins at a temperature from 120° C. to 250° C. and at a pressure from 15 to 4500 psig in the presence of a complex according to claim 1 and an activator selected from the group consisting of:

(i) aluminoxane compounds $R^{20}{}_2AlO(R^{20}AlO)_m AlR^{20}{}_2$ wherein each $R^{20}$ is independently selected from the group consisting of $C_{1-20}$ hydrocarbyl radical and m is from 5 to 30 to provide a molar ratio of aluminum in the activator to aluminum in the complex from 20:1 to 1000:1;

(ii) anions of the formula $[B(R^{18})4]^-$ wherein each $R^{18}$ is independently selected from the group consisting of phenyl radicals which are unsubstituted or substituted by up to 5 substituents selected from the group consisting of a fluorine atom, a $C_{1-4}$ alkyl or alkoxy radical which is unsubstituted or substituted by a fluorine atom and a silyl radical of the formula —$Si(R^{19})_3$; wherein each $R^{19}$ is independently selected from the group consisting of a hydrogen atom and a $C_{1-4}$ alkyl radical; and an activator of the formula $[B(R^{18})_3]$ wherein $R^{18}$ is as defined above, to provide a molar ratio of B:Al from 0.4 to 1.2; and (iii) a mixture of (i) and (ii) above.

DETAILED DESCRIPTON OF THE PREFERRED EMBODIMENTS

The term "scavenger" as used in this specification is meant to include those compounds effective for removing polar impurities from the reaction solvent. Such impurities can be inadvertently introduced with any of the polymerization reaction components, particularly with solvent, monomer and catalyst feed; and can adversely affect catalyst activity and stability. It can result in decreasing or even elimination of catalytic activity, particularly when an activator capable of ionizing the catalyst is also present.

In the complexes of formula I of the present invention each $R^1$ may be independently selected from the group consisting of $C_{1-8}$ straight or branched alkyl radical or a $C_{6-12}$ cyclic aliphatic or aromatic radical; and radicals of the formula $Si(R^6)_3$ wherein each $R^6$ is independently selected from the group consisting of $C_{1-8}$ alkyl and alkoxy radicals, preferably $R^6$ is selected from the group consisting of $C_{1-4}$ alkyl radicals.

If $R^1$ is a hydrocarbyl radical it may be selected from the group consisting of a $C_{1-4}$ straight or branched alkyl radical or a $C_{6-12}$ cyclic aliphatic or aromatic radical. Suitable hydrocarbyl radicals include methyl, ethyl, propyl, butyl, iso-butyl, tert-butyl and phenyl radicals.

In the complexes of the present invention $R^3$ may be selected from the group consisting of consisting of $C_{1-8}$ alkyl radicals and $C_{6-12}$ aromatic radicals which are unsubstituted or substituted with one or more halogen atoms or a $C_{1-4}$ alkyl radical. Suitable radicals include $C_{1-4}$ straight chained or branched alkyl radicals and $C_{6-12}$ cyclic aliphatic or aromatic radicals. These radicals include methyl, ethyl, propyl, butyl, iso-butyl, tert-butyl, and phenyl radicals.

In some embodiments of the present invention the $R^1$ substituents are the same. In some embodiments of the present invention the $R^3$ substituents are the same.

In the complexes of formula I, each $R^4$ may be independently selected from the group consisting of $C_{1-8}$ alkyl and alkoxy radicals, X is a halogen atom and b is 1, or 2, preferably 2. In some embodiments of the present invention $R^4$ may be selected from the group consisting of $C_{1-4}$ alkyl radicals. Suitable halogen atoms include chlorine and fluorine, preferably chlorine atoms.

In the complexes of formula I, $R^5$ is selected from the group consisting of $C_{1-8}$ straight chained, branched or cyclic aliphatic radicals and $C_{6-12}$ cyclic aliphatic and aromatic radicals and a is an integer so that the valence state of Y−2=a. For example, if Y at $R^5$ is an oxygen atom a=0 and if Y at $R^5$ is a nitrogen atom a=1. Preferably, $R^5$ is selected from the group consisting of $C_{1-4}$ alkyl radicals and $C_{6-12}$ cyclic alkyl and aromatic radicals.

In the complexes of formula I, $R^2$ is selected from the group consisting of $C_{1-8}$ straight chained, branched or cyclic aliphatic radicals and $C_{6-12}$ cyclic aliphatic and aromatic radicals. In the complexes of formula I, c may be 0 or 1. If c is 0 the ring becomes a 5-membered ring and there is a direct bond from the carbon atom to the aluminum atom. Preferably, $R^2$ is selected from the group consisting of $C_{1-4}$ alkyl radicals and $C_{6-12}$ cyclic alkyl and aromatic radicals.

In the complexes of formula I, Y is a heteroatom independently selected from the group consisting of a nitrogen atom, an oxygen atom and a sulfur atom. Preferably Y, which is substituted by $R^2$ is a nitrogen atom and preferably Y at substituent $R^5$ is an oxygen atom or a nitrogen atom.

The complexes of formula I may be prepared by reacting a compound of formula II:

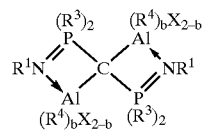

wherein $R^1$, $R^3$, $R^4$ and X are as defined above with a compound selected from the group consisting of $R^5YC(YR^2)_d$ and $R^2Y{=}C{=}O$ wherein Y, $R^2$, $R^5$ and d are as defined above, provided that if a reactant of the formula $R^2Y{=}C{=}O$ is used in the complex of formula I, a is 0 and if a reactant of the formula $R^5YC(YR^2)d$ is used and d is 0 then in the complex of formula I c is 0 and if d is 1 then in the complex of formula I c is 1.

In the above reactants preferably Y is a nitrogen atom. In the compound of the formula $R^5YC(YR^5)_d$ if d is 0 and Y is nitrogen the reactant is

wherein $R^5$ is as defined above. In this case in formula I c is 0 (e.g. one of the rings in the formula is a 5-membered ring with the aluminum bonded to one of the carbon atoms.

If d is 1 and Y is a nitrogen atom then the reactant is $R^5N=C=NR^2$ wherein $R^5$ and $R^2$ are as defined above. If the reactant has this formula then in formula I both heteroatoms (Y's) are nitrogen and a is 1 and c is 1.

The reaction is conducted under an inert atmosphere, such as argon, in an inert solvent or diluent such as a hydrocarbyl solvent or diluent at temperature from about 50° C. to 200° C., preferably from about 120° C. to 180° C.

The resulting compounds of formula I may be used to polymerize one or more olefins, generally alpha olefins, typically having from 2 to 10, preferably 8 carbon atoms or less. Illustrative non-limiting examples of such alpha-olefins are one or more of propylene, 1-butene, 1-pentene, 1-hexene, 1-octene and 1-decene.

The compound and an activator are dissolved or suspended in an inert solvent or diluent such as a hydrocarbyl solvent or diluent in the presence of an activator and the ethylene is introduced into the reaction vessel.

The polymerization may be conducted at temperatures from about 20 to about 250° C. Depending on the product being made, this temperature may be relatively low such as from 20° C. to about 120° C. (desirably 119° C. or less) for a slurry polymerization or from about 120° C. to 250° C. for a solution polymerization. The pressure of the reaction may be as high as about 15,000 psig (103.5 MPa gauge) (for the older high pressure processes) or may range from about 15 to 4,500 psig (0.1035 MPa gauge to about 31.01 MPa gauge).

Solution polymerization processes are fairly well known in the art. These processes are conducted in the presence of an inert hydrocarbon solvent typically a $C_{5-12}$ hydrocarbon which may be unsubstituted or substituted by $C_{1-4}$ alkyl group such as pentane, hexane, heptane, octane, cyclohexane, methylcyclohexane or hydrogenated naphtha. An additional solvent is Isopar E ($C_{8-12}$ aliphatic solvent, Exxon Chemical Co.).

The polyethylene polymers which may be prepared in accordance with the present invention typically comprise not less than 60, preferably not less than 70, most preferably not less than 80 weight % of ethylene and the balance of one or more $C_{4-10}$ alpha olefins, preferably selected from the group consisting of 1-butene, 1-hexene and 1-octene.

The activator may be selected from the group consisting of:
  (i) an aluminoxane; and
  (ii) an activator capable of ionizing the catalyst (which may be used in combination with an alkylating activator).

The aluminoxane activator may be of the formula $(R^{20})_2AlO(R^{20}AlO)_mAl(R^{20})_2$ wherein each $R^{20}$ is independently selected from the group consisting of $C_{1-20}$ hydrocarbyl radicals, m is from 0 to 50, and preferably $R^{20}$ is a $C_{1-4}$ alkyl radical and m is from 5 to 30. The aluminoxane activator may be used prior to the reaction but preferably in situ alkylation is typical (e.g. alkyl groups replacing leaving ligands, hydrogen or halide groups).

Activation with aluminoxane generally requires a molar ratio of aluminum in the activator to the catalyst from 20:1 to 1000:1.

The activator of the present invention may be a combination of an alkylating activator which also serves as a scavenger other than aluminoxane in combination with an activator capable of ionizing the catalyst.

The alkylating activator (which may also serve as a scavenger) may be selected from the group consisting of:

$(R)_pMgX_{2-p}$ wherein X is a halide, each R is independently selected from the group consisting of $C_{1-10}$ alkyl radicals, preferably $C_{1-8}$ alkyl radicals and p is 1 or 2; $(R)_qZnX_{2-q}$ wherein R is as defined above, X is halogen and q is 1 or 2; $(R)_sAlX_{3-s}$ wherein R is as defined above, X is halogen and s is an integer from 1 to 3. Preferably, in the above compounds R is a $C_{1-4}$ alkyl radical and X is chlorine. Commercially available compounds include triethyl aluminum (TEAL), diethyl aluminum chloride (DEAC), dibutyl magnesium $((Bu)_2Mg)$ and butyl ethyl magnesium (BuMgEt).

The activator capable of ionizing the catalyst may be selected from the group consisting of:
  (i) compounds of the formula $[R^{15}]^+[B(R^{18})_4]^-$ wherein B is a boron atom, $R^{15}$ is a cyclic $C_{6-7}$ aromatic cation or a triphenyl methyl cation and each $R^{18}$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom, and a silyl radical of the formula $—Si—(R^{19})_3$ wherein each $R^{19}$ is independently selected from the group consisting of a hydrogen atom and a $C_{1-4}$ alkyl radical; and
  (ii) compounds of the formula $[(R^{16})_tZH]^+[B(R^{18})_4]^-$ wherein B is a boron atom, H is a hydrogen atom, Z is a nitrogen atom or phosphorus atom, t is 3 and $R^{16}$ is selected from the group consisting of $C_{1-8}$ alkyl radicals, a phenyl radical which is unsubstituted or substituted by up to three $C_{1-4}$ alkyl radicals, or one $R^{16}$ taken together with the nitrogen atom to form an anilinium radical and $R^{18}$ is as defined above; and
  (iii) compounds (activators) of the formula $B(R^{18})_3$ wherein $R^{18}$ is as defined above.

In the above compounds, preferably $R^{18}$ is a pentafluorophenyl radical, $R^{15}$ is a triphenylmethyl cation, Z is a nitrogen atom and $R^{16}$ is a $C_{1-4}$ alkyl radical or $R^{16}$ taken together with the nitrogen atom to form an anilinium radical which is substituted by two $C_{1-4}$ alkyl radicals.

The activator capable of ionizing the catalyst abstracts one or more $R^4$ substituents so as to ionize the catalyst center into a cation, but not to covalently bond with the catalyst; and to provide sufficient distance between the ionized catalyst and the ionizing activator to permit a polymerizable olefin to enter the resulting active site.

Examples of compounds capable of ionizing the catalyst include the following compounds:
  triethylammonium tetra(phenyl)boron,
  tripropylammonium tetra(phenyl)boron,
  tri(n-butyl)ammonium tetra(phenyl)boron,
  trimethylammonium tetra(p-tolyl)boron,
  trimethylammonium tetra(o-tolyl)boron,
  tributylammonium tetra(pentafluorophenyl)boron,
  tributylammonium tetra(pentafluorophenyl)boron,
  tri(n-butyl)ammonium tetra(o-tolyl)boron,
  N,N-dimethylanilinium tetra(phenyl)boron,
  N,N-diethylanilinium tetra(phenyl)boron,
  N,N-diethylanilinium tri(phenyl)n-butylboron,
  N,N-2,4,6-pentamethylanilinium tetra(phenyl)boron,
  di-(isopropyl)ammonium tetra(pentafluorophenyl)boron,
  dicyclohexylammonium tetra(phenyl)boron,
  triphenylphosphonium tetra(phenyl)boron,
  tri(methylphenyl)phosphonium tetra(phenyl)boron,
  tri(dimethylphenyl)phosphonium tetra(phenyl)boron, tropillium tetrakispentafluorophenyl borate,
triphenylmethylium tetrakispentafluorophenyl borate,
benzene (diazonium) tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available activators which are capable of ionizing the catalyst include:
N, N-dimethylaniliniumtetrakispentafluorophenyl borate,
triphenylmethylium tetrakispentafluorophenyl borate, and
trispentafluorophenyl boron.

The molar ratio of boron in the activator to aluminum in the complex may be from about 0.4 to about 1.2, preferably from about 0.5 to 1.1.

If the aluminum compound of formula I is activated with a combination of an aluminum alkyl compound (which may include aluminoxane), and a compound capable of ionizing the catalyst; the molar ratios of aluminum in the compound of formula I: metal in the alkylating agent (e.g. Al):metalloid (e.g. boron or phosphorus) in the activator capable of ionizing the catalyst (e.g. boron) may range from 1:1:1 to 1:100:5.

Preferably, the alkylating activator is premixed/reacted with the catalyst and the resulting alkylated species is then reacted with the activator capable of ionizing the catalyst.

It is believed the complexes of the present invention may be used in the presence of a support. An exemplary list of support materials include metal oxides (such as silica, alumina, silica-alumina, titania and zirconia); metal chlorides (such as magnesium chloride); talc, polymers (including polyolefins); partially prepolymerized mixtures of a group 4 metal complex, activator and polymer; spray dried mixtures of the group 4 metal complex, activator and fine "inert" particles (as disclosed, for example, in European Patent Office Application 668,295 (to Union Carbide)).

A typical support material is silica. The silica may be pre-treated with an aluminoxane (especially methylaluminoxane or "MAO") prior to the deposition of the aluminum complex. The procedure for preparing "supported MAO" which is described in U.S. Pat. No. 5,534,474 (to Witco) is preferred for reasons of economy. It will be recognized by those skilled in the art that silica may be characterized by such parameters as particle size, pore volume and residual silanol concentration. The pore size and silanol concentration may be altered by heat treatment or calcining. The residual silanol groups provide a potential reaction site between the aluminoxane and the silica (and, indeed, some off gassing is observed when aluminoxane is reacted with silica having residual silanol groups). This reaction may help to "anchor" the aluminoxane to the silica (which, in turn, may help to reduce reactor fouling).

The particle size, pore volume and residual silanol concentration may be influenced by reactor conditions. Typical silicas are dry powders having a particle size from 1 to 200 microns (with an average particle size from 36 to 100 being especially suitable); pore size from 50 to 500 Angstroms; and pore volumes of from 0.5 to 5.0 cubic centimeters per gram. As a general guideline, the use of commercially available silicas, such as those sold by W. R. Grace under the trademarks Davison 948 or Davison 955, are suitable.

In a solution polymerization, the monomers are dissolved/dispersed in the solvent either prior to being fed to the reactor or for gaseous monomers, the monomer may be fed to the reactor so that it will dissolve in the reaction mixture. Prior to mixing, the solvent and monomers are generally purified to remove polar moieties. The polar moieties or catalyst poisons include water, oxygen, metal impurities, etc. Preferably steps are taken before provision of such into the reaction vessel, for example by chemical treatment or careful separation techniques after or during the synthesis or preparation of the various components. The feedstock purification prior to introduction into the reaction solvent follows standard practices in the art (e.g. molecular sieves, alumina beds and oxygen removal catalysts) are used for the purification of ethylene, alpha-olefin and optional diene. The solvent itself as well (e.g. cyclohexane and toluene) is similarly treated. In some instances, out of an abundance of caution, excess scavenging activators may be used in the polymerization process.

The feedstock may be heated prior to feeding into the reactor. However, in many instances it is desired to remove heat from the reactor so the feedstock may be at ambient temperature to help cool the reactor.

Generally, the components may be premixed in the solvent for the reaction or fed as separate streams to the reactor. In some instances, premixing is desirable to provide a reaction time for the catalyst components prior to entering the reaction. Such an "in line mixing" technique is described in a number of patents in the name of DuPont Canada Inc. For example, it is described in U.S. Pat. No. 5,589,555 issued Dec. 31, 1996.

The reactor may comprise a tube or serpentine reactor used in "high pressure" polymerizations or it may comprise one or more reactors or autoclaves. It is well known that the use in series of two such reactors each of which may be operated so as to achieve different polymer molecular weight characteristics. The residence time in the reactor system will depend on the design and the capacity of the reactor. Generally, the reactors should be operated under conditions to achieve a thorough mixing of the reactants. On leaving the reactor system, the solvent is removed and the resulting polymer is finished in a conventional manner.

The present invention will be illustrated by the following non-limiting examples in which, unless otherwise specified, part means parts by weight (e.g. grams) and percent means weight percent.

Synthesis of Aluminum Complexes

Aluminum C=C Preparations

All experimental manipulations were performed under rigorously anaerobic conditions using Schlenk techniques or an argon-filled glovebox.

Preparation of [(AlMe$_2$)$_2${(Me$_3$SiN=PPh$_2$)2C=C(O)N(Ad)-κO,κN,κN',κN"}]

[(AlMe$_2$){μ$_2$-C(Ph$_2$P=NSiMe$_3$)$_2$-κC,κC,κN,κN'}] (0.20 g, 0.30 mmol) and adamantyl-iso-cyanate (0.053 g, 0.30 mmol) were dissolved in toluene (10 mL) and heated at 120° C. for 24 hours. The resultant solution was concentrated to one third of the original volume and the flask was left at room temperature for two days. Colorless crystals were obtained which were filtered and dried under vacuum. Yield=0.18 g, 71.2%. IR data (Nujol Mull): 1348s, 1340s, 1304m, 1268m, 1252s, 1190w, 1138w, 1109s, 1052s, 1031m, 1014s, 1000m, 922w, 852s, 788m, 762m, 750m, 741m, 713m, 694s, 659m, 601w, 532 m. $^1$H NMR (C$_6$D$_6$): d 7.60 (m, Ph), 7.39 (m, Ph), 6.90 (m, Ph), 6.68 (m, Ph), 2.14 (s, CH$_2$-Ad), 1.92 (s, CH-Ad), 1.53 (br.dd, CH$_2$-Ad), 0.12 (s, CH$_3$—Al), 0.09 (s, CH$_3$Si), -0.0.2 (s, CH$_3$Si), -0.09 (s, CH$_3$—Al). $^{13}$C {$^1$H} NMR (C$_6$D$_6$): δ178.8 (br.s, C—O), 134.0 (m, ortho phenyl), 133.8 (m, ortho phenyl), 133.3 (m, ipso phenyl), 132.9 (m, ipso phenyl), 131.8 (d, para phenyl), 131.3 (d, para phenyl), 128.3 (m, meta phenyl), 128.0 (m, meta phenyl), 58.5 (s, C-Ad), 55.9 (dd, P—C—P, $^1J_{PC}$=128 Hz, 123 Hz), 42.3 (s, CH$_2$-Ad), 36.7 (s, CH$_2$-Ad), 30.5 (s, CH-Ad), 4.7 (s, CH$_3$Si), 3.7 (s, CH$_3$Si), 0.9 (s, CH$_3$—Al), —5.3 (s, CH$_3$—Al). $^{31}$P{$^1$H} NMR (C$_6$D$_6$): δ31.6 (d), 28.97 (d) $^2J_{PP}$=61.5 Hz. Analysis calculated for C$_{46}$H$_{65}$Al$_2$N$_3$OP$_2$Si$_2$: C, 65.14; H, 7.72; N, 4.95. Found: C, 65.09; H, 7.89; N, 4.84. The complex has been structurally characterized by X-ray crystallography.

Preparation of [(AlMe$_2$)$_2${(Me$_3$SiN=PPh$_2$C=C(NCy)$_2$-κN,κN',κ",κ"}]

The preparation procedure was analogous to the preparation of [(AlMe$_2$)$_2${(Me$_3$SiN=PPh$_2$)$_2$C=C(O)N(Ad)-κO, κN,κN',κN"}] starting from [(AlMe$_2$){μ$_2$—C(Ph$_2$P=NSiMe$_3$)$_2$-κC,κC,κN,κN'}] (0.15 g, 0.22 mmol) and dicyclohexylcarbodiimide (0.046 g, 0.22 mmol). Yield=0.15 g, 73.9%. IR data (Nujol Mull): 1438s, 1357s, 1332s, 1296s, 1269s, 1251s, 1188s, 1111s, 1088s, 1071m, 1034s, 999m, 962m, 902s, 891m, 850s, 821m, 783s, 742s, 716m, 685s, 652s, 600s, 577m, 533s, 497 s. $^1$H NMR (C$_6$D$_6$): δ8.44 (m, Ph), 7.37 (m, Ph), 7.29 (m, Ph), 7.12 (m, toluene), 7.03 (m, toluene), 6.38 (m, Ph), 6.26 (br, Ph), 5.97 (br, Ph), 3.60 (br.s, ipso-Cy), 2.26 (br.m, Cy), 2.10 (s, toluene), 1.73 (br.s, Cy), 1.47 (m, Cy), 1.21 (m, Cy), 1.04 (m, Cy), 0.73 (m, Cy), 0.39 (s, CH$_3$Si), -0.03 (s, CH$_3$-Al), -0.21 (s, CH$_3$-Al). $^{13}$C {$^1$H} NMR (C$_6$D$_6$): δ187.8 (br.t, C=C, $^2J_{PC}$=4.7 Hz), 137.8 (s, Tol), 136.5 (m, ortho-Ph), 135.0 (m, ipso-Ph), 133.6 (m, ortho-Ph), 132.6 (m, ortho-Ph), 132.0 (s, para-Ph), 131.3 (s, para-Ph), 131.2 (m, ipso-Ph), 129.3 (s, Tol), 129.0 (m, meta-Ph), 128.5 (s, Tol), 125.6 (Tol), 65.0 (t, P—C—P, $^1J_{PC}$=106 Hz), 64.2 (s, CH-Cy), 33.5 (s, CH$_2$-Cy), 32.8 (s, CH$_2$-Cy), 27.4 (s, CH$_2$-Cy), 26.1 (s, CH$_2$-Cy), 21.4 (s, Me-Tol), 4.8 (s, SiMe$_3$), 0.6 (br.s, Al-Me), -3.4 (br.s, Al-Me). $^{31}$P{$^1$H) NMR (C$_6$D$_6$): δ30.15 (s). Analysis calculated for [(AlMe$_2$)$_2${(Me$_3$SiN=PPh$_2$)$_2$C=C(NCy)$_2$-κN, κN',κN",κN"}]. Toluene, C$_{48}$H$_{72}$Al$_2$N$_4$P$_2$Si$_2$: C, 68.15; H, 8.32; N, 5.78. Found: C, 67.85; H, 8.45; N, 5.64. The complex has been structurally characterized by X-ray crystallography.

Preparation of [(AlMe$_2$)$_2${(Me$_3$SiN=PPh$_2$)$_2$C=CN(Ar')-κC,κN,κN',κN"}]

[(AlMe$_2$){μ$_2$—C(Ph$_2$Ph$_2$P=NSiMe$_3$)$_2$-κC,κC,κN,κN'}] (0.15 g, 0.22 mmol) and 3,5 dimethyl phenyl isonitrile (0.029 g, 0.22 mmol) were dissolved in toluene (5 mL) and heated at 120° C. for three days. The resultant solution was concentrated to one third of the original volume and the flask was left at room temperature for two days. Colorless crystals were obtained which were filtered and dried under vacuum. Yield=0.12 g, 66.9%. $^{31}${$^1$H} NMR (C$_6$D$_6$): δ36.1 (d), 21.3(d) $^2J_{PP}$=94 Hz. Analysis calculated for C$_{44}$H$_{59}$Al$_2$N$_3$P$_2$Si$_2$: C, 65.89; H, 7.41; N, 5.24. Found: C, 65.68; H, 7.51; N, 5.02.

Polymerization Results

In the examples, the pressures given are gauge pressures. The following abbreviations and terms are used:

MeOH: methanol

PMAO-IP: a type of polymethylaluminoxane

Polydispersity (Pd): weight average molecular weight (Mw) divided by number average molecular weight (Mn)

DSC: differential scanning calorimetry

GPC: gel permeation chromatography

Tm: polymer melting point

All the polymerization experiments described below were conducted using a 500 mL Autoclave Engineers Zipperclave reactor. All the chemicals (solvent, catalyst and cocatalyst) were fed into the reactor batchwise except ethylene which was fed on demand. No product was removed during the polymerization reaction. As are known to those skilled in the art, all the feed streams were purified prior to feeding into the reactor by contact with various absorption media to remove catalysts killing impurities such as water, oxygen, sulfur and polar materials. All components were stored and manipulated under an atmosphere of purified argon or nitrogen. The reactor uses a programmable logic control (PLC) system with Wonderware 5.1 software for the process control. Ethylene polymerizations were performed in the reactor equipped with an air driven stirrer and an automatic temperature control system.

Polymerization temperature was 50° C. for slurry polymerizations. The polymerization reaction time was 30 minutes for slurry experiment. Whereas polymerization temperature was 160° C. for solution polymerizations. The polymerization reaction time was 10 minutes for solution polymerization. The reaction was terminated by adding 5 mL of methanol to the reactor and the polymer was recovered by evaporation of the toluene. The polymerization activities were calculated based on the weight of the polymer produced.

Toluene was purchased from Aldrich and purified over a series of purification beds (various absorption media) prior to use. [CPh$_3$][B(C$_6$F$_5$)$_4$] was purchased from Asahi Glass Inc.; lot#: 980224.

Polymer molecular weights and molecular weight distributions were measured by GPC (Waters 150—C) at 140° C. in 1,2,4-trichlorobenzene calibrated using polyethylene standards.

DSC was conducted on a DSC$_{220}$ C from Seiko Instruments. The heating rate is 10° C./min from 0 to 200° C.

Slurry Polymerizations

EXAMPLE 1

[(AlMe$_2$)$_2${(Me$_3$SiN=PPh$_2$)$_2$C=C(O)N(Ad)}] Activated by [CPh$_3$][B(C$_6$F$_5$)$_4$] for Ethylene Homopolymerization Toluene (216 mL) was transferred into the reactor with 0.05 mL of PMAO-IP 1 mmol/L) as scavenger. The solution was heated to 50° C. and saturated with 300 psig of ethylene. [(AlMe$_2$)$_2${(Me$_3$SiN=PPh$_2$)$_2$C=C(O)N(Ad)}] (64.8 umol, 54.6 mg) was dissolved in toluene and injected into the reactor. At the same time, [CPh$_3$][B(C$_6$F$_5$)$_4$] (136.08 umol, 125.52 mg) was dissolved in toluene (12.2 mL) and injected into the reactor. A slight (2–3° C.) temperature rise was observed and the polymerization reaction was terminated by adding 5 mL of MeOH after 30 minutes. The polymer was dried. Yield=1.6 g. Activity=49.2 gPE/mmolcat*hr. M.P.= 133.4° C.

EXAMPLE 2

[(AlMe$_2$)$_2$(Me$_3$SiN=PPh$_2$)$_2$C=C(O)N(Ad)}] Activated by PMAO-IP for Ethylene Homopolymerization Toluene (216 mL) was transferred into the reactor. The solution was heated to 50° C. and saturated with 300 psig of ethylene. 12.2 mL of toluene solution of PMAO-IP (36 mmol, 1.74 mL) as a scavenger and catalyst precursor. The [(AlMe$_2$)$_2${(Me$_3$SiN=PPh$_2$)$_2$C=C(O)N(Ad)}] (64.8 umol, 54.96 mg) was dissolved in toluene (12.2 mL) and then injected into the reactor, one minute after the PMAO-IP solution. No temperature rise was observed and the polymerization reaction was terminated by adding 5 mL of MeOH after 30 minutes. The polymer was dried. Yield=1.5 g. Activity=46.1 gPE/mmolcat*hr. M.P.=133.8° C.

Solution Polymerization

EXAMPLE 3

[(AlMe$_2$)$_2${(Me$_3$SiN=PPh$_2$)$_2$C=C(O)N(Ad)}] Activated by [CPh$_3$][B(C$_6$F$_5$)] for Ethylene Homopolymerization Toluene (216 mL) was transferred into the reactor with 0.05 mL of PMAO-IP (1 mmol/L) as a scavenger. The solution was heated to 160° C. and saturated with 200 psig of ethylene. [(AlMe$_2$)$_2${(Me$_3$SiN=PPh$_2$)$_2$C=C(O)N(Ad)}] (43.2 umol, 36.64 mg) was dissolved in toluene and injected into the reactor. At the same time, [CPh$_3$][B(C$_6$F$_5$)$_4$] (90.72 umol, 83.68 mg) was dissolved in toluene (12.2 mL) and injected into the reactor. No temperature rise was observed. After 10 minutes the same amount catalyst and cocatalyst were injected into the reactor. The polymerization reaction was finally terminated by adding 5 mL of MeOH. The polymer was dried. Yield=2.5 g. Activity=86.0 gPE/mmolcat*hr. Mw=696.7×10$^3$. Pd=2.02. M.P.=135.20° C.

What is claimed is:

1. A complex of formula I:

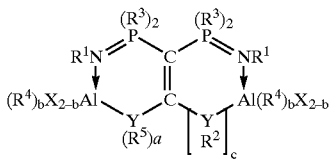

wherein each R$^1$ is independently selected from the group consisting of a C$_{1-8}$ straight or branched alkyl radical, a C$_{6-12}$ cyclic aliphatic or aromatic radical and a radical of the formula Si(R$^6$)$_3$ wherein each R$^6$ is independently selected from the group consisting of C$_{1-8}$ alkyl and alkoxy radicals; R$^2$ is selected from the group consisting of C$_{1-8}$ straight chained, branched or cyclic aliphatic radicals and C$_{6-12}$ cyclic aliphatic and aromatic radicals; c is 0 or 1; each R$^3$ is independently selected from the group consisting of C$_{1-8}$ alkyl radicals and C$_{6-12}$ aromatic radicals which are unsubstituted or substituted by one or more substituents selected from the group consisting of halogen atoms and C$_{1-4}$ alkyl radicals; each R$^4$ is independently selected from the group consisting of C$_{1-8}$ alkyl radicals, X is a halogen atom and b is 1 or 2; R$^5$ is selected from the group consisting of C$_{1-8}$ straight chained, branched or cyclic aliphatic radicals and C$_{6-12}$ cyclic aliphatic and aromatic radicals; Y is a heteroatom selected from the group consisting of an oxygen atom, a nitrogen atom and a sulfur atom and a is an integer so that the valence state of Y−2=a.

2. The complex of claim 1, wherein all R$^3$ radicals are the same and are selected from the group consisting of C$_{1-4}$ alkyl radicals and a phenyl radicals which are unsubstituted or further substituted by a fluorine or chlorine atom or a C$_{1-4}$ alkyl radical and a radical of the formula Si(R$^6$)$_3$ wherein each R$^6$ is independently selected from the group consisting of C$_{1-4}$ alkyl radical.

3. The complex of claim 2, wherein R$^1$ is a C$_{1-4}$ straight or branched alkyl radical or a C$_{6-12}$ cyclic aliphatic or aromatic radical.

4. The complex according to claim 3, wherein R$^2$ is selected from the group consisting of C$_{1-4}$ alkyl radicals and C$_{6-12}$ cyclic alkyl and aromatic radicals.

5. The complex of claim 4, wherein R$^4$ is selected from the group consisting of C$_{1-4}$ alkyl radicals.

6. The complex of claim 5, wherein X is a chlorine or fluorine atom.

7. The complex of claim 6, wherein c is 1.

8. The complex of claim 7, wherein Y substituted by R$^5$ is an oxygen atom, a is 0 and Y substituted by R$^2$ is a nitrogen atom.

9. The complex of claim 8, wherein b is 2.

10. The complex of claim 9, wherein each R$^1$ is a radical of the formula Si(R$^6$)$_3$ wherein each R$^6$ is independently selected from the group consisting of C$_{1-4}$ alkyl radical.

11. The complex of claim 7, wherein each Y is a nitrogen atom and a is 1.

12. The complex of claim 11 wherein R$^5$ is selected from the group consisting of C$_{1-4}$ alkyl radicals and C$_{6-12}$ cyclic alkyl and aromatic radicals.

13. The complex of claim 12, wherein b is 2.

14. The complex of claim 13, wherein each R$^1$ is a radical of the formula Si(R$^6$)$_3$ wherein each R$^6$ is independently selected from the group consisting of C$_{1-4}$ alkyl radical.

15. The complex of claim 6 wherein c is 0.

16. The complex of claim 15, wherein Y is a nitrogen atom and a is 1.

17. The complex of claim 16, wherein b is 2.

18. The complex of claim 17, wherein each R$^1$ is a radical of the formula Si(R$^6$)$_3$ wherein each R$^6$ is independently selected from the group consisting of C$_{1-4}$ alkyl radical.

19. A process for preparing a complex of formula I of claim 1, comprising reacting a compound of formula II:

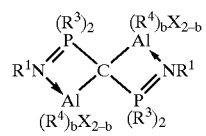

wherein each R$^1$ is independently selected from the group consisting of a C$_{1-8}$ straight or branched alkyl radical, a C$_{6-12}$ cyclic aliphatic or aromatic radical and a radical of the formula Si(R$^6$)$_3$ wherein each R$^6$ is independently selected from the group consisting of C$_{1-8}$ alkyl and alkoxy radicals; each R$^3$ is independently selected from the group consisting of C$_{1-8}$ alkyl radicals and C$_{6-12}$ aromatic radicals which are unsubstituted or substituted by one or more substituents selected from the group consisting of halogen atoms and C$_{1-4}$ alkyl radicals; each R$^4$ is independently selected from the group consisting of C$_{1-8}$ alkyl radicals, X is a halogen atom and b is 1 or 2; with a compound selected from the group consisting of R$^5$YC(YR$^2$)d and R$^2$Y=C=O wherein R$^2$ is selected from the group consisting of C$_{1-8}$ straight chained, branched or cyclic aliphatic radicals and C$_{6-12}$ cyclic aliphatic and aromatic radicals; d is 0 or 1; R$^5$ is selected from the group consisting of C$_{1-8}$ straight chained, branched or cyclic aliphatic radicals and C$_{6-12}$ cyclic aliphatic and aromatic radicals; Y is a heteroatom selected from the group consisting of an oxygen atom, a nitrogen atom and a sulfur atom, provided that if a reactant of the formula R$^2$Y=C=O is used in the complex of formula I, a is 0 and if a reactant of the formula $R^5YC(YR^2)_d$ is used if d is 1 c is 1 and if d is 0, c is 0.

20. The process according to claim 19 wherein the reactant is $R^2 Y=C=O$.

21. The process of claim 20, wherein all $R^3$ radicals are the same and are selected from the group consisting of $C_{1-4}$ alkyl radicals and a phenyl radicals which are unsubstituted or further substituted by a fluorine or chlorine atom or a $C_{1-4}$ alkyl radical and a radical of the formula $Si(R^6)_3$ wherein each $R^6$ is independently selected from the group consisting of $C_{1-4}$ alkyl radical.

22. The process of claim 21, wherein $R^1$ is a $C_{1-4}$ straight or branched alkyl radical or a $C_{6-12}$ cyclic aliphatic or aromatic radical.

23. The process according to claim 22, wherein $R^2$ is selected from the group consisting of $C_{1-4}$ alkyl radicals and $C_{6-12}$ cyclic alkyl and aromatic radicals.

24. The process of claim 23, wherein $R^4$ is selected from the group consisting of $C_{1-4}$ alkyl radicals.

25. The process of claim 24, wherein X is a chlorine or fluorine atom.

26. The process of claim 25, wherein Y is an oxygen atom.

28. The process of claim 27, wherein each $R^1$ is a radical of the formula $Si(R^6)_3$ wherein each $R^6$ is independently selected from the group consisting of $C_{1-4}$ alkyl radical.

29. The process of claim 19, wherein the reactant is a compound of the formula of the formula $R^5YC[YR^2]_d$.

30. The process of claim 29, wherein all $R^3$ radicals are the same and are selected from the group consisting of $C_{1-4}$ alkyl radicals and a phenyl radicals which are unsubstituted or further substituted by a fluorine or chlorine atom or a $C_{1-4}$ alkyl radical and a radical of the formula $Si(R^6)_3$ wherein each $R^6$ is independently selected from the group consisting of $C_{1-4}$ alkyl radical.

31. The process of claim 30, wherein $R^1$ is a $C_{1-4}$ straight or branched alkyl radical or a $C_{6-12}$ cyclic aliphatic or aromatic radical.

32. The process according to claim 31, wherein $R^2$ is selected from the group consisting of $C_{1-4}$ alkyl radicals and $C_{6-12}$ cyclic alkyl and aromatic radicals.

33. The process of claim 32, wherein $R^4$ is selected from the group consisting of $C_{1-4}$ alkyl radicals.

34. The process of claim 33, wherein X is a chlorine or fluorine atom.

35. The process of claim 34, wherein each Y is a nitrogen.

36. The process of claim 35 wherein $R^5$ is selected from the group consisting of $C_{1-4}$ alkyl radicals and $C_{6-12}$ cyclic alkyl and aromatic radicals.

37. The process of claim 36, wherein b is 2.

38. The process of claim 37 wherein d is 1.

39. The process of claim 37 wherein d is 0.

* * * * *